(12) United States Patent
Killian et al.

(10) Patent No.: US 8,489,882 B2
(45) Date of Patent: Jul. 16, 2013

(54) THIRD-PARTY WATERMARKING

(75) Inventors: Thomas Killian, Westfield, NJ (US);
Norman L. Schryer, New Providence, NJ (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 489 days.

(21) Appl. No.: 12/380,820

(22) Filed: Mar. 3, 2009

(65) Prior Publication Data
US 2010/0228983 A1    Sep. 9, 2010

(51) Int. Cl.
*H04L 29/06* (2006.01)

(52) U.S. Cl.
USPC .............................. 713/176; 705/51; 707/640

(58) Field of Classification Search
CPC .............................. H04L 9/32; H04L 2209/608
USPC ............................ 705/51; 707/640; 713/176
See application file for complete search history.

(56) References Cited

U.S. PATENT DOCUMENTS

| | | | |
|---|---|---|---|
| 6,226,618 B1 * | 5/2001 | Downs et al. .................... | 705/51 |
| 8,126,745 B1 * | 2/2012 | Bohanek ........................... | 705/4 |
| 8,316,102 B2 * | 11/2012 | Matsuzaki et al. ............. | 709/217 |
| 2002/0032863 A1 * | 3/2002 | Ha ................................ | 713/176 |
| 2005/0086325 A1 * | 4/2005 | Slipp et al. ..................... | 709/219 |
| 2008/0240490 A1 * | 10/2008 | Finkelstein et al. ........... | 382/100 |
| 2010/0088235 A1 * | 4/2010 | Chatfield et al. ............... | 705/59 |
| 2010/0169652 A1 * | 7/2010 | Butler ............................ | 713/176 |

* cited by examiner

*Primary Examiner* — Jung Kim
*Assistant Examiner* — Ngoc D Nguyen
(74) *Attorney, Agent, or Firm* — Scott P. Zimmerman, PLLC

(57) ABSTRACT

A "third-party watermark" is inserted into a file or files uploaded by a client to a "storing party" such as a file backup server. The third-party watermark may contain information about the upload itself, such as time and date of the upload and the identity of the client. The third-party watermark may also contain authentication information received from the client or elsewhere that establishes that the client is in proper possession of the file, e.g., it is not a "bootlegged" copy.

4 Claims, 2 Drawing Sheets

THIRD-PARTY WATERMARKING

BACKGROUND

The present invention relates to digital watermarking, also called computational watermarking.

Digital watermarking (hereinafter "watermarking") is a technique wherein information is embedded into a digital file in a way which does not noticeably affect the file contents. Thus a watermark can be inserted into, for example, a media file such as an MPG audio or video file or a JPG still image file without there being any noticeable change in how the audio sounds or what the still image or video looks like.

Watermarks can be applied at the time a file is created—for example, when a CD master is made or when a copy of the file is downloaded to a purchaser from an on-line store—and can used for identification and enforcement purposes. The exact content of the information embedded in the watermark depends on the particular application, but may include the identity of the creator or the distributor of the work, the identity of a person to whom the work was sold, a customer account number, or the licensing terms between seller and purchaser. The information thus embedded can be used to demonstrate content ownership, content misappropriation or as a proof of purchase.

Specifically, a rights holder holds intellectual property rights, such as a copyright, in all or a portion of the contents of many files, such as music files, video files and so forth. The information embedded in the watermark can be "authentication information" that establishes that someone in possession of a copy of the file obtained it in a manner authorized by the rights holder. Such authentication information could have, for example, been inserted into the file at the time of a download by an on-line music store or other distributor who was authorized by the rights holder to distribute copies of the file and might include information about the transaction, as noted above.

SUMMARY

The present invention is directed to yet another use of watermarks, referred to herein as "third-party watermarking."

In accordance with the invention, one or more watermarks are inserted into a body of digital information—such as a text file or an audio or image file—by an entity or party (the "storing party") that receives and stores uploaded files from clients for later retrieval by the uploading party or by others. This "third-party watermark" would typically be inserted into the file upon receipt by the storing party before it is stored. We use the term "third-party" watermark as a convenient way of distinguishing it from a watermark that had already been inserted into the file—such as by an on-line music store—before it was transmitted to the client. The uploaded digital information is referred to herein as a file or files, but the term "file" is intended to encompass any body of digital information that a client may upload to the storing party and that is capable of being digitally watermarked, whether or not that body of digital information meets any strict definition of the term "file." The file and/or information represented by the digital data of the file is also sometimes referred to herein as "content."

The storing party may be, for example, a file backup service to which clients upload files over the internet. If a client's copy of the file is lost due to computer malfunction or theft, the client is able to download a replacement copy of the file from the file backup service. Another storing party that could advantageously use the invention is a web hosting company that receives and stores uploaded web page files, e.g., html files.

The information embedded in the third-party watermark by the storing party can be of one or more different categories of information. The information in the various categories might all be embedded in one third-party watermark, each in its own respective different third-party watermark, or some combination of these.

One such category may be information relating to the upload itself, such as information identifying the uploading client and the time and date of the upload.

Another such category may be information—herein referred to as "authentication data"—establishing that the client is rightfully in possession of the file. The authentication data could be in various forms, such as: a JPG image of a paper receipt or an emailed receipt received by the client from an on-line music store or other distributor authorized by the rights holder. While better than nothing, such authentication data may be subject to question by an inquiring party because such authentication data would be easy to forge. However, in accordance with a feature of the invention, the storing party may obtain proof-of-purchase or other authentication data directly from the client's source (e.g., the on-line music store), the payment agent (e.g., credit card company that issued the credit card that was used to purchase the download from the on-line music store), or some other independent party. The authentication data may be not a proof-of-purchase per se because the client may have subscribed to an unlimited-download account with the on-line music store wherein the client is entitled to download as much music as s/he desires for a flat fee. The authentication data will in any event, however, be such as to establish that the client's copy was obtained from an authorized source.

The insertion of a third-party watermark into the file prior to its being stored by the storing party can benefit both the storing party itself and the uploading party.

As one example as to how the storing party can benefit, consider the possibility that a hacker hacks into the storing party's server in which the uploaded client files have been stored; retrieves stored media files, such as audio recordings or movies; and then redistributes them. If these "bootleg" copies are somehow traced back to the storing party, the storing party will be able to establish that it had not itself illegally obtained the copies but, rather, had accepted them in good faith on such-and-such a date from such-and-such a client. If the third-party watermark also contains authentication data, so much the better in terms of establishing that the file was obtained by the client in an authorized way.

As one example as to how the client can benefit from third-party watermarking, consider the fact that record industry spyware or other software may peruse the contents of the client's computer looking for unauthorized copies of copyrighted content, such as bootlegged music files. The client would like to have ready proof, perhaps even directly readable by the spyware, that music stored in the client's computer was properly obtained.

So now assume that the client had legitimately obtained a copy of a music album from an on-line store; then uploaded to the storage server either the entire album or individual tracks "ripped" from the album; and thereafter downloaded the album or tracks back down into the client's computer. And now consider the possibility that the client is accused of being in possession of a bootlegged copy.

In certain circumstances, on the one hand, the client may not require the benefit of third-party watermarking. That is, the client may be able to readily establish on his/her own that the client's copy of the album or tracks is legitimate. For example, the client may have a physical or emailed receipt; or the client may be able to locate in her personal records a transaction number that can be used to recover information about the transaction from the on-line store's database or from a credit card company or other payment agent whose services were used to effectuate the purchase transaction; or a watermark with embedded authentication information might have been inserted into the album or the individual tracks by the on-line store at the time of download.

In other circumstances, however, none of these forms of proof may be available. The client may have lost the receipt; the original downloaded files may never have been watermarked by the on-line store; or the on-line store may have gone out of business, making it no longer possible to look up the transaction.

Advantageously, however, if the client had, say, provided the transaction number to the storing party at the time of the upload (which is assumedly before the client lost track of the transaction number), the storing party could have at that time obtained relevant proof-of-purchase or other authentication information from the on-line store (assuming that the store was set up to receive such requests) and then the storing party could have inserted the authentication information into the third-party watermark, where it would always be available for inspection.

In particular scenarios in which the invention might be used, the storing party—call it the XYZ File Backup Service—may enter into an agreement with one or more on-line stores whereby, when a media file or other file is obtained on-line, the on-line store asks the client if the client would like to have the file backed up by XYZ File Backup Service. If the client elects to have this done, a copy of the file could be sent not only to the client but to the XYZ File Backup Service, along with authentication information that the file backup service could then embed in the third-party watermark.

DETAILED DESCRIPTION OF AN ILLUSTRATIVE EMBODIMENT

Figure 1:
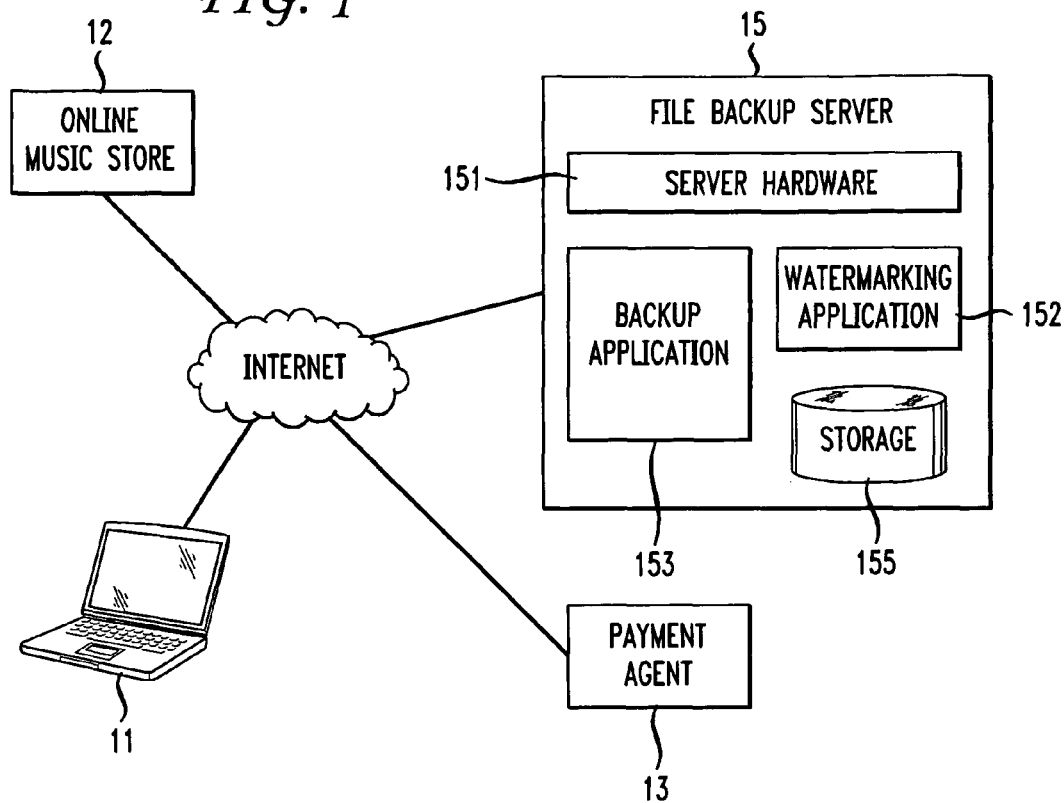
FIG. 1 is a block diagram of an illustrative system in which the present invention may be implemented.

FIG. 1 shows a client's computer 11 connected to the internet. Computer 11 is representative of a multiplicity of internet-connected computers, each of which may individually upload files to a file backup server as described herein.

The client may create a new audio, video, text or other file locally on computer 11 or may obtain it from any of various sources. One such source is on-line music store 12, from which the client may download music files pursuant to some payment arrangement with the on-line music store, such as pay-per-download or unlimited download. Also connected to the internet is a payment agent 13, which might be a credit card company or the client's bank. Purchases from the on-line store may involve the services of payment agent 13 to pay for the downloaded music.

The remaining element shown in FIG. 1 is file backup server 15. This server is operated by a file backup service which enables clients to upload media files, as well as any other desired type of file, to file backup server 15, where they are stored in storage memory 155. Clients can later download selected one(s) of their files from server 15, e.g., in the case where files were inadvertently erased or otherwise lost. File backup server 15 further includes server hardware 151, which includes one or more processors and associated peripherals and other components typically included in such a server. File backup server 15 further includes backup application 153. This is software which, when executed by the server hardware, implements the file backup service as just described. File backup server 15 further includes watermarking application 152. This is software which, when executed by the server hardware, creates and inserts watermarks into files that are uploaded to the server by clients.

File backup server 15 may be any appropriate server hardware purchased from a commercial vendor. One typical such server is the SPARC Enterprise T5140 manufactured by Sun Microsystems, Inc.

Figure 2:
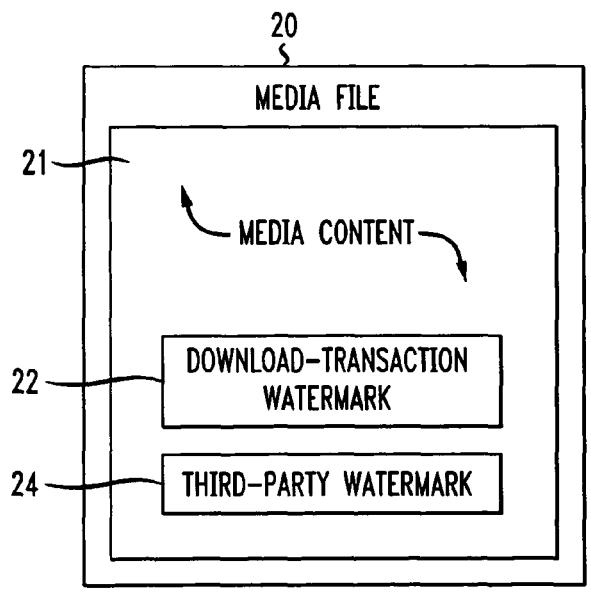
FIG. 2 is a schematic representation of a media file into which watermarks have been inserted.

FIG. 2 is a conceptual representation of a media file, taken as illustrative. The media file includes media content 21, which is MPEG-, JPG- other encoded or non-encoded bits representing audio and/or image information. Two watermarks have been inserted into media content 21. One of these is a download-transaction watermark 22 that may have been inserted by a file source, such as an on-line store, prior to downloading the file to a purchaser or other client. The download-transaction watermark may include various pieces of information about the transaction, such as information identifying the source, the client, the time and date of the transaction, etc. Certain files uploaded to the storing party may include such a download-transaction watermark, but some may not.

The other watermark inserted into media content 21 is third-party watermark 24, as described herein. This third-party watermark was inserted into the file content—illustratively watermarking application 152—at the time that the file was uploaded to server 15.

Watermarks 22 and 24 are depicted as discrete portions of the media content 21 for pedagogic simplicity. As is well known, however, such digital watermarks are created through a computational, algorithmic process that modifies the bits that represent the media content. This is done in such a way that the modification of the media content does not affect to any significant extent how the media sounds or looks to the normal listener but yet allows the information embedded into the watermark to be retrieved from the file. The particular watermarking algorithm used in server 15 is of no consequence to the present invention. Any known or future-developed algorithm can be used. Typical of current state-of-the-art watermarking algorithms are those described in Digital Watermarking and Steganography, $2^{nd}$ ed., by Ingemar J. Cox, Matthew Miller, Jeffrey Bloom, Jessica Fridrich and Ton Kalker (pub. Morgan Kaufmann, 2007; ISBN 0123725852).

Figure 3:
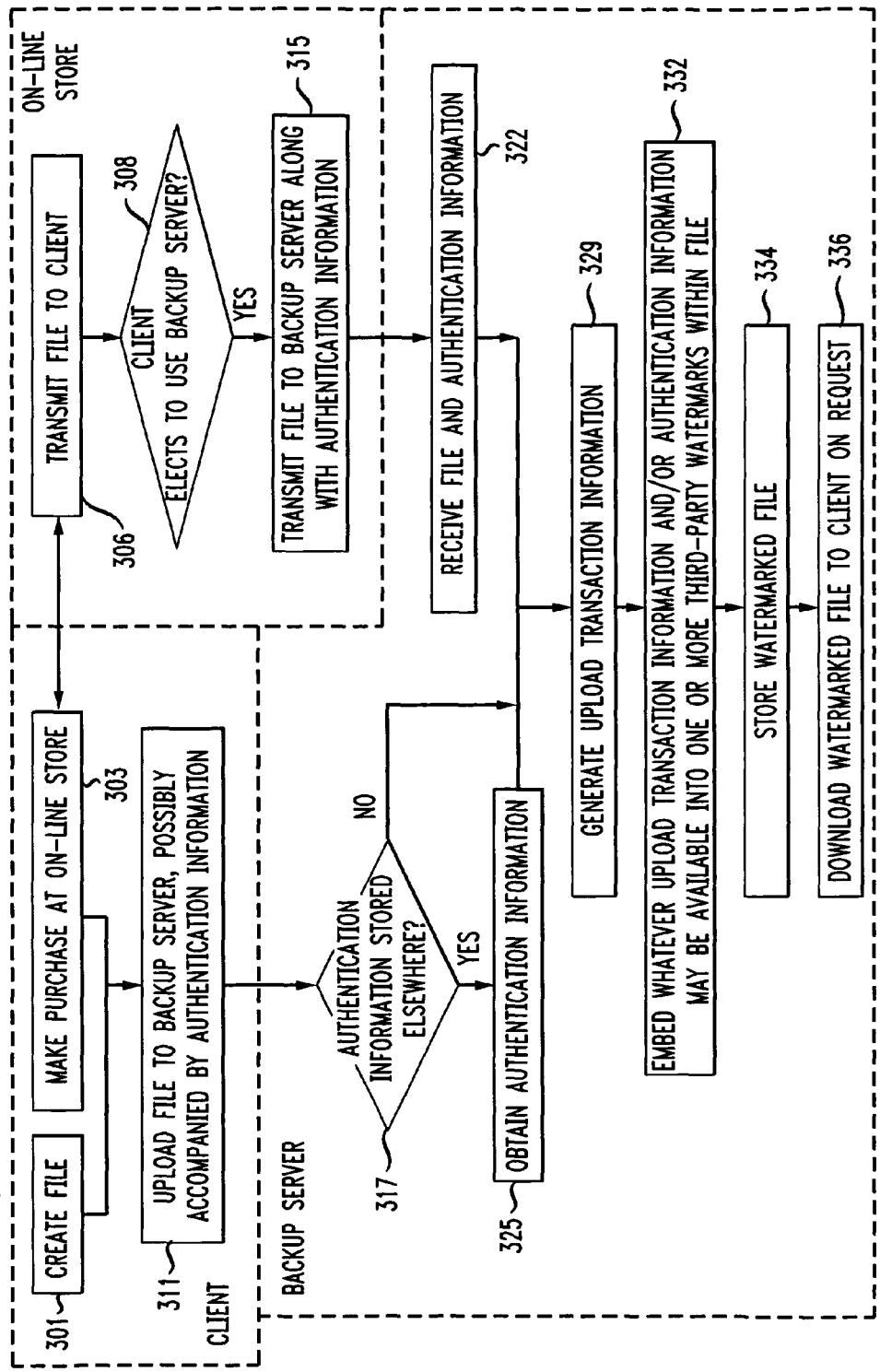
FIG. 3 is a flow chart of a method illustratively implemented in the system of FIG. 1 in carrying out the invention.

FIG. 3 is a flowchart of a method illustratively implemented in the system of FIG. 1 in carrying out the invention. The various components of the method are performed by the client's computer 11, the on-line store 12 and the file backup server 15, as FIG. 3 denotes.

Initially, the client creates a file or files, as indicated at 301, or may obtain a file from elsewhere, as indicated at 303—in this example by making a purchase at an on-line store. The client may, for example, use a credit card to pay for an individual download, or the client may have an unlimited-download or package subscription with the on-line store, in which case the obtaining of the music file is not a purchase per se. In any event, the on-line store, in due course, downloads the file to the client, as indicated at 306.

It is assumed that the client has already established an account with the file backup service. As part of the interaction with the on-line store, the client may have elected to have the just-obtained file backed up at file backup server 15, as determined at 308. In that case, as indicated at 315, the on-line store sends a copy of the file to file backup server 15, along with information identifying the client and information about this transaction, such as a transaction number or other information, all which is received by the file backup server as indicated at 322. File backup server 15's further processing of the data just received is described at a more opportune point below.

We return at this point to the client. As indicated at 311, the client has decided to back up a certain file in computer 11 by uploading that file to server 15. As part of the interaction with server 15, the client is prompted at 317 to indicate whether the client has any proof-of-purchase or other authentication information relative to the files being uploaded.

That authentication information is illustratively one of two types in this example.

In particular, the client may have an image file showing an image of a receipt or other proof that the client has paid for, or is otherwise in proper possession of, the file to be uploaded. Such proof would be evidence that the file is not a bootleg copy. In that case, the client might like to upload that image file along with the content itself so that it can be embedded in the third-party watermark that will be inserted by the file backup service. Alternatively, as indicated at 317, the client may have information that points to proof-of-purchase or other authentication data, such as a transaction record number that was issued by the on-line store, or by the payment agent, or perhaps by a service that functions as a central clearinghouse for such transaction records. If any of these is the case, the client may supply the transaction number to file backup server 15. The server, in turn—pursuant to a prearranged relationship with the on-line store, payment agent or transaction record service—obtains the proof-of-purchase or other authentication information from the appropriate source, as indicated at 325.

The client may not have any proof-of-purchase or other authentication information. Receipts and/or transaction numbers may have been lost; the content may, indeed, be a bootlegged copy; or the content may have been created by the client or might have been received from elsewhere without any restriction on further dissemination. For example, the file may be a simple text file or a homemade media file created by the client's brother's after-school rock band. In all such cases, obviously, the client will upload the file without any proof-of-purchase or other authentication information.

We have to this point seen three different scenarios in which a file, with or without authentication credentials, has arrived at server 15—a) content created by the client or received by the client without restrictions on further dissemination; b) content obtained by the client that IS subject to restrictions, such as a copyrighted music file that the client received from an on-line store; and c) a file that, pursuant to client wishes, the server received directly from the on-line store, along with proof-of-purchase or other authentication information.

These three scenarios coalesce at 329, where server 15 generates upload transaction information pertinent to the upload transaction itself. This upload transaction information may thus include such pieces of data as the time and date and the source of the file, such as a) the identity of the client (or at least an account number that the file backup service has established for the client), or b) the identity of the on-line store that had sent the file at 315.

Watermarking application 152 thereupon inserts one or more third-party watermarks into the file, as indicated at 332. These one or more third-party watermarks embed into the file whatever upload transaction information and/or b) authentication information has been generated and/or received by file backup server 15. The resulting watermarked file is then stored at 334 in backup storage 155 from which it can later be download to the client on request, as indicated at 336.

The foregoing merely illustrates the invention and many variations are possible. For example, although the discussion herein often makes reference to media files, any type of file that, now or in the future, is able to be digitally watermarked can have inserted therein a third-party watermark pursuant to the principles of the present invention. The use of the term "client" is intended to be generic to any person who uses or owns a computer or other instrumentality that is capable of uploading files to a storing party as described here.

Although the various components of the system are shown in FIG. 1 as being in communication with one another over the internet, any other form of network or electronic communication medium or infrastructure may be involved in the various communications, particularly those between the client and the file backup server.

The term "server" is intended to encompass any apparatus, system or combination of these—be it hardware, software (in any of its various forms such as a firmware) or any combination of these—that is capable of carrying out the functions described herein as being performed by file backup server 15.

Although in the illustrative embodiment the storing party is a file backup service operating a file backup server, the invention is equally usable by any entity that receives files and wants to embed into those files—for its own benefit or for the benefit of the uploading party—one or more third-party watermarks as described herein. Web hosting companies and internet service providers are examples of entities that receive and store such files.

In the illustrative embodiment, the third-party watermark is inserted into the uploaded file at the time of upload. However, the invention encompasses the possibility that the storing party may desire to insert the watermark at some time after the file was uploaded and initially stored and/or may desire to insert one or more new or modified third-party watermarks to, for example, embed new information into the file, such as authentication information that the client did not provide at the time of the original upload.

Some of the claims hereof recite certain elements in means-plus-function terms. At the heart of applicants' invention is the notion of inserting third-party watermarks into files as described herein. Thus what is at the heart of the invention is a new combination of functionalities brought together to achieve one or advantages in a new and non-obvious way rather than the use of any particular equipment or apparatus to implement those functionalities. Thus applicants regard any equipment or apparatus that is capable of carrying out the functions called for in the various means-plus-function recitations of the claims as being equivalent to those which are explicitly shown and/or described herein.

It should thus be understood that those skilled in the art will be able to devise various alternative arrangements and steps that, although not explicitly or implicitly shown or described herein, implement the principles of the invention and are therefore within the spirit and scope of the invention as claimed.

The invention claimed is:

1. A method performed by a file backup service implemented on a server that receives files from at least first, second and third clients over the internet and stores the received any type of files for the clients in such a way that the clients are able to download replacement copies from the file backup service, the method comprising the file backup service receiving from the first client during at least one upload transaction an uploaded first digital file capable of being digitally watermarked, the uploaded first digital file containing content for which a first rights holder holds copyright rights in all or a portion of the contents of the first digital file, the file backup service prompting the first client for authentication information that can be used to establish that the first digital file was rightly obtained by the first client, the file backup service receiving from the first client a transaction identifier identifying a transaction in which the first client had purchased the first digital file from an on-line store that sells authorized copies of digital files to purchasers, the file backup service transmitting the transaction identifier received from the first client to the on-line store, the file backup service receiving from the on-line store, in response to the transmission of the transaction identifier, proof-of-purchase information establishing that the first client had purchased the first digital file from the on-line store, the file backup service digitally watermarking the first digital file with a third-party watermark that contains the proof-of-purchase information establishing that the first client had purchased the first digital file from the on-line store, the file backup service downloading the third-party-watermarked first digital file to the first client, the file backup service storing the third-party-watermarked first digital file, the file backup service receiving from the second client during at least a second upload transaction an uploaded second digital file capable of being digitally watermarked, the uploaded second digital file containing content for which a second rights holder holds copyright rights in all or a portion of the contents of the second digital file, the file backup service prompting the second client for authentication information that can be used to establish that the second digital file was rightly obtained by the second client, the file backup service receiving from the second client an image of a sales receipt establishing that the second client had purchased the second digital file from said on-line store, the file backup service digitally watermarking the second digital file with a third-party watermark that contains the image of the sales receipt establishing that the second client had purchased the second digital file from said on-line store, the file backup service downloading the third-party-watermarked second digital file to the second client, the file backup service storing the third-party-watermarked second digital file, the file backup service receiving from said on-line store a third digital file capable of being digitally watermarked, the third digital file containing content for which a third rights holder holds copyright rights in all or a portion of the contents of the third digital file, the third digital file having been transmitted from said on-line store to the file backup service in response to an indication from the third client, who had obtained the third digital file from the on-line store, that said third client wanted to have the third digital file backed up by the file backup service, the file backup service further receiving from said on-line store proof-of-purchase information establishing that the third digital file was purchased by the third client from the on-line store, the file backup service digitally watermarking the third digital file with a third-party watermark that contains the proof-of-purchase information establishing that the third digital file was purchased by the third client from the on-line store, and the file backup service storing the third-party-watermarked third digital file.

2. The method of claim 1 further comprising in response to a hacker a) hacking into a server of the file backup service and b) redistributing the third-party-watermarked first, second and third digital files, the file backup service utilizing the third-party watermarks in the third-party-watermarked first, second and third digital files to prove that the first, second and third digital files uploaded to the file backup service by the first, second and third clients, respectively, were properly obtained by the first, second and third clients.

3. The method of claim 1 further comprising, in response to discovery of the third-party-watermarked first, second and third digital files by spyware looking for unauthorized copies of copyrighted content in computers of the first, second and third clients, using the third-party watermarks therein to establish that the first, second and third digital files had been properly obtained by the first, second and third clients, respectively.

4. A file backup server of a type that receives files from at least first, second and third clients over the internet and stores the received any type of files for the clients in such a way that the clients are able to download replacement copies from the file backup service, the file backup server comprising file backup server hardware that includes at least one processor, and a non-transitory storage medium storing program instructions that, when executed by said at least one processor, cause the file backup server to carry out the steps of receiving from the first client during at least one upload transaction an uploaded first digital file capable of being digitally watermarked, the uploaded first digital file containing content for which a first rights holder holds copyright rights in all or a portion of the contents of the first digital file, prompting the first client for authentication information that can be used to establish that the first digital file was rightly obtained by the first client, receiving from the first client a transaction identifier identifying a transaction in which the first client had purchased the first digital file from an on-line store that sells authorized copies of digital files to purchasers, transmitting the transaction identifier received from the first client to the on-line store, receiving from the on-line store, in response to the transmission of the transaction identifier, proof-of-purchase information establishing that the first client had purchased the first digital file from the on-line store, digitally watermarking the first digital file with a third-party watermark that contains the proof-of-purchase information establishing that the first client had purchased the first digital file from the on-line store, downloading the third-party-watermarked first digital file to the first client, storing the third-party-watermarked first digital file, receiving from the second client during at least a second upload transaction an uploaded second digital file capable of being digitally watermarked, the uploaded second digital file containing content for which a second rights holder holds copyright rights in all or a portion of the contents of the second digital file, prompting the second client for authentication information that can be used to establish that the second digital file was rightly obtained by the second client, receiving from the second client an image of a sales receipt establishing that the second client had purchased the second digital file from said on-line store, digitally watermarking the second digital file with a third-party watermark that contains the image of the sales receipt establishing that the second client had purchased the second digital file from said on-line store, downloading the third-party-watermarked second digital file to the second client, storing the third-party-watermarked second digital file, receiving from said on-line store a third digital file capable of being digitally watermarked, the third digital file containing content for which a third rights holder holds copyright rights in all or a portion of the contents of the third digital file, the third digital file having been transmitted from said on-line store to the file backup service in response to an indication from the third client, who had obtained the third digital file from the on-line store, that said third client wanted to have the third digital file backed up by the file backup service, further receiving from said on-line store proof-of-purchase information establishing that the third digital file was purchased by the third client from the on-line store, digitally watermarking the third digital file with a third-party watermark that contains the proof of purchase information establishing that the third digital file was purchased by the third client from the one-line store, and storing the third-party-watermarked third digital file.

* * * * *